United States Patent
Beatty et al.

(10) Patent No.: US 10,134,447 B2
(45) Date of Patent: Nov. 20, 2018

(54) HUMIDITY CONTROL FOR ENCLOSURE

(71) Applicant: Seagate Technology LLC, Cupertino, CA (US)

(72) Inventors: Paul A. Beatty, Fort Collins, CO (US); Joe A. Wood, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 411 days.

(21) Appl. No.: 15/088,675

(22) Filed: Apr. 1, 2016

(65) Prior Publication Data

US 2016/0336045 A1 Nov. 17, 2016

Related U.S. Application Data

(63) Continuation of application No. 14/749,421, filed on Jun. 24, 2015, now Pat. No. 9,302,795.

(60) Provisional application No. 62/161,029, filed on May 13, 2015.

(51) Int. Cl.
| | |
|---|---|
| *B65D 81/26* | (2006.01) |
| *G11B 33/14* | (2006.01) |
| *B65B 5/04* | (2006.01) |
| *B65B 61/20* | (2006.01) |
| *B65B 25/00* | (2006.01) |
| *B65B 31/00* | (2006.01) |
| *B01D 53/14* | (2006.01) |

(52) U.S. Cl.
CPC ...... *G11B 33/1453* (2013.01); *B01D 53/1412* (2013.01); *B65B 5/04* (2013.01); *B65B 25/002* (2013.01); *B65B 31/00* (2013.01); *B65B 61/20* (2013.01); *B65D 81/266* (2013.01); *B01D 2252/10* (2013.01); *B01D 2252/205* (2013.01); *B01D 2252/2053* (2013.01)

(58) Field of Classification Search
CPC ........ B65B 5/04; B65D 81/26; B65D 81/264; G11B 33/1453
See application file for complete search history.

(56) References Cited

U.S. PATENT DOCUMENTS

| | | |
|---|---|---|
| 3,744,209 A | 7/1973 | Conley et al. |
| 5,009,308 A | 4/1991 | Cullen et al. |
| 5,267,646 A | 12/1993 | Inoue et al. |
| 5,293,286 A | 3/1994 | Hasegawa et al. |
| 5,378,428 A | 1/1995 | Inoue et al. |
| 5,509,254 A | 4/1996 | Ullrich |
| 5,551,557 A | 9/1996 | Brooks et al. |
| 5,669,754 A | 9/1997 | Croteau et al. |
| 5,778,638 A | 7/1998 | Watanabe et al. |
| 5,870,885 A | 2/1999 | Biddle et al. |
| 6,101,790 A | 8/2000 | Mori et al. |
| 6,155,027 A | 12/2000 | Brooks |
| 6,357,207 B1 | 3/2002 | Weder |
| 6,644,362 B2 | 11/2003 | Bernett |
| 6,762,909 B2 | 7/2004 | Albrecht et al. |

(Continued)

*Primary Examiner* — Gloria R Weeks
(74) *Attorney, Agent, or Firm* — Crawford Maunu PLLC (57) ABSTRACT

Aspects of this disclosure are directed to methods, apparatuses and approaches involving the use of a moisture absorbing material (e.g., desiccant) to control moisture. As may be implemented consistent with one or more embodiments, moisture is removed from an environmental control module that includes a desiccant material contained within a package. Liquid is deposited inside the package and sealed with the desiccant in the package.

14 Claims, 9 Drawing Sheets

(56) References Cited

U.S. PATENT DOCUMENTS

| | | | |
|---|---|---|---|
| 6,914,742 B1 | 7/2005 | Fioravanti et al. | |
| 7,783,747 B2 | 8/2010 | Abernethy, Jr. et al. | |
| 9,364,119 B2* | 6/2016 | Versteylen | A47J 47/10 |
| 9,573,734 B2* | 2/2017 | Lebon | B65D 81/264 |
| 2003/0182903 A1 | 10/2003 | Garwood | |
| 2006/0032931 A1 | 2/2006 | Gunderson | |
| 2008/0142434 A1* | 6/2008 | Mabuchi | A61L 2/087 |
| | | | 210/500.41 |
| 2010/0078336 A1 | 4/2010 | Reyhan et al. | |
| 2012/0090275 A1 | 4/2012 | Uchida et al. | |
| 2012/0311968 A1 | 12/2012 | Jaiswal | |
| 2015/0298843 A1* | 10/2015 | Broeders | B29C 66/43121 |
| | | | 206/484 |

* cited by examiner

HUMIDITY CONTROL FOR ENCLOSURE

BACKGROUND

Various types of circuitry and mechanical components benefit from operation in a controlled environment. For instance, temperature, humidity, and chemical interaction may affect electronic and/or mechanical devices. Controlling an environment, however, can be difficult or expensive with regard to manufacturing and long-term use. Further, failure to properly control an environment can adversely affect the performance or lifetime of various components.

One type of component that is susceptible to issues relating to its environment is a disk drive, which is used for data storage in modern electronic products ranging from digital cameras to computer systems and networks. A disk drive may include a mechanical portion, or head disk assembly (HDA), and electronics in the form of a printed circuit board assembly (PCBA), mounted to an outer surface of the HDA. The PCBA controls HDA functions and provides an interface between the disk drive and its host. An HDA includes moving parts such as one or more magnetic disks affixed to a spindle motor assembly for rotation at a constant speed, an actuator assembly supporting an array of read/write heads that traverse generally concentric data tracks radially spaced across the disk surfaces and a voice coil motor (VCM) providing rotational motion to the actuator assembly. In operation, the magnetic-recording disk rapidly rotates by the spindle motor to access (read and/or write) the data stored on the disk.

The above challenges can result in issues relating to manufacturing, implementation and longevity for disk drives and a variety of other components.

SUMMARY

Various example embodiments are directed to apparatuses and/or methods that mitigate issues relating to humidity and other exposure of electrical and/or mechanical components. As may be implemented in accordance with one or more embodiments, a package is provided with a desiccant therein, and having a liquid sealed within the package along with the desiccant. The desiccant absorbs the liquid and operates with the package to provide moisture control upon the opening of a passageway into the package.

In accordance with one or more embodiments, a method involves removing moisture from an environmental control module having a package and a desiccant material contained within the package. A liquid is deposited inside the package, and is sealed along with the desiccant in the package.

Other embodiments are directed to an apparatus, as may be implemented consistent with methods as characterized herein. In one or more such embodiments, an apparatus includes a package, a desiccant material and liquid contained within the package, and a seal that seals the liquid and desiccant material in the package. The seal operates with the package, desiccant material and liquid to, upon opening of a passage through the seal, maintain a humidity level within an enclosure environment in which the package resides. For instance, humid gas may be passed between an interior region of the package and an enclosure environment in which the package resides, via the passage.

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements involving long-term use of enclosed electronic and/or mechanical devices. Specific embodiments of the present disclosure are believed to be particularly beneficial to a disk drive apparatus including complex moving mechanisms such as spindle motors and HDAs as described above. While the present disclosure is not necessarily so limited, various aspects of the disclosure may be appreciated through a discussion of examples using this context.

Various aspects of the present disclosure are directed toward maintenance of environmental conditions within an enclosure housing electronic and/or mechanical components. Electronic and/or mechanical components are often contained within an enclosure that protects the components from particulates and other environment-related contaminants that may shorten life span of the components (e.g., via friction and/or corrosion). In addition to particulates and other environment-related contaminants, environmental conditions within the enclosure may affect life span of electronic and/or mechanical components housed therein. For instance, relative humidity (RH) within an enclosure of a disk drive may affect the performance and reliability of the head/disk interfaces (HDI), which can be important for the magnetic recording process. For example, head-to-disk stiction and media corrosion are aggravated by high relative humidity levels. As another example, excessive disk wear and electrostatic discharge may occur at very low relative humidity levels. Accordingly, various embodiments are directed to addressing these issues as relate to electronic and/or mechanical components, using a package having a desiccant that absorbs (or has absorbed) a predetermined amount of liquid therein.

In some embodiments, an apparatus includes an environmental control module configured to regulate relative humidity within an enclosure. The environmental control module includes a desiccant material contained within a package. The desiccant material absorbs and releases water vapor according to a humidity level in the environment relative to a moisture level of the desiccant material. By charging the desiccant material to a specific moisture level, the environmental control module may be configured to set and maintain relative humidity in an enclosure to a target relative humidity.

In some embodiments, a moisture level is set and/or moisture is removed from an environmental control module and/or desiccant material therein, prior to adding a predetermined amount of moisture. This approach can be used to set an amount of moisture added to such a module, using a baseline amount of moisture known to be present in the module. For instance, the module may be dried such that negligible moisture is present, prior to adding a predetermined amount of liquid. Moisture may be extracted, for example, by increasing temperature (e.g., in an oven) and/or decreasing atmospheric pressure (e.g., in a vacuum chamber) to evaporate liquid and expand water vapor trapped in the environmental control module. Liquid may remain, for example, in crevices of the environmental control module following manufacturing processes that utilize liquids (e.g., for washing or etching components). The evaporated liquid escapes from the environmental control module through an opening that remains uncovered during the extraction process. The extraction processes remove substantially all moisture from the environmental control module. Because substantially all moisture is removed, multiple environmental control modules may be set to baseline moisture level (e.g., 0%, or less than about 5%), regardless of the original moisture content of the environmental control modules. In this manner, variability of moisture levels resulting from variation in manufacturing processes may be removed.

After removing moisture from the environmental control module, liquid is deposited inside the environmental control module. This may be accomplished, for example, by depositing liquid via an opening in a package of the environmental control module, or injecting moisture using an approach that generally maintains the package in a sealed condition (e.g., by injecting by way of a needle extending through a membrane that re-seals upon removal of the needle). A seal is placed over the opening to contain the liquid water within the environmental control module. The desiccant material absorbs vapor resulting from evaporation of the liquid within the package. In this manner, the desiccant material may be set to a desired moisture content with high accuracy. An amount of moisture in the package can be increased by injecting additional liquid, to suit particular implementations.

In some embodiments, the environmental control module is placed in an enclosure with electrical and/or mechanical components, and the enclosure is closed (e.g., sealed). The seal over the opening in the environmental control module includes, or may be made to include, a channel for transfer of water vapor (or other gaseous material) into and out of the environmental control module. The channel allows water vapor released from the desiccant material to transfer to the enclosure and/or excess water vapor in the enclosure to be absorbed by the desiccant material. In some implementations, the desiccant material is configured with a moisture level sufficient to maintain a desired relative humidity in an enclosure over a period (e.g., a number of years), over which moisture may escape from the enclosure. As one example, it has been determined that lifespan of components in a hard disk drive may be enhanced by maintaining relative humidity in an enclosure of the hard drive within a range of 6% to 15%. In some embodiments, the desiccant material is configured to have a moisture level sufficient to maintain a desired relative humidity in an enclosure to 10%+/−4% (e.g., over a set time period).

The amount of liquid water required to be added to the environmental control module to set the desiccant material to a moisture level sufficient to maintain a desired relative humidity may be determined using various processes. The amount of liquid water may be determined, for example, using a look-up table indicating respective amounts corresponding to a plurality of relative humidity levels for a specific amount of desiccant material and enclosure volume.

The environmental control module may include various materials to absorb and/or release water vapor or various other elements (e.g., volatile organic vapor contaminates). Materials for absorption may include, for example, silica gel A, activated carbons, chemical getters, chemical acid buffers, bicarbonates and polymers such as polyacrylic acid (PAA) or polyacrylamide (PAM), and various combinations thereof.

Various embodiments are directed to methods involving setting a moisture level within a desiccant such as discussed above (e.g., drying the desiccant by heating), and adding liquid/moisture to the desiccant in order to set a specific level of moisture therein. For instance, about all liquid can be removed, such that a resulting moisture level is set via the amount of liquid added after drying. The desiccant is sealed within a package and, upon opening of the package (e.g., puncturing of a seal or wall of the package), operates to facilitate the exchange of moisture with an environment in which the package resides. In some implementations, the amount of the desiccant material is set to absorb a first amount of the liquid, which is deposited therein, and is set to provide a specified relative humidity for a predefined enclosure volume.

In some implementations, an opening such as a channel is provided or formed in the package. The opening is arranged in size and location to provide restricted transfer of moisture between the package and an environment in which the package resides. The opening is sealed, which seals the desiccant and liquid within the package (with the liquid being added before and/or after sealing). Once the package is in place, the seal can be re-opened to allow moisture transfer as discussed herein. In some embodiments, a membrane is placed between the desiccant material and the opening, and transfers moisture therebetween.

In certain embodiments, the liquid and the desiccant are sealed within the package by applying a structural component having a channel operable to transfer moisture at a restricted rate and exposed to an environment in the package that includes the desiccant. A sealing component seals the channel, and in response to being altered (e.g., punctured or otherwise having a portion thereof removed), provides an opening into the channel that couples the environment in the package with an environment external to the package.

The desiccant material is used to maintain relative humidity in an enclosure for a variety of approaches. For instance, relative humidity may be maintained within a target range by absorbing additional water vapor in response to relative humidity in the enclosure exceeding the target range, and releasing water vapor in response to relative humidity in the enclosure falling below the target range.

Various embodiments are directed to controlling moisture for a circuit component sealed within an enclosure. A package or environmental control module as discussed herein is sealed with the circuit component. An opening is provided in the package, before or after sealing the opening, and the desiccant material and vapor absorbed therein is used to set a moisture level in the enclosure via the provided opening. The circuit component may include non-volatile memory, or be provided as part of a hard disk drive (e.g., having hard disk-drive disk, a head-actuation assembly, and a motor in the enclosure, in which the head-actuation assembly and the motor read and write data on the disk).

Other embodiments are directed to an apparatus, as may be implemented consistent with methods as characterized herein. In one or more such embodiments, an apparatus includes a package, a desiccant material and liquid contained within the package, and a seal that seals the liquid and desiccant material in the package. The seal (e.g., a material and an adhesive that adheres to an external or other surface of the package) operates with the package, desiccant material and liquid to, upon opening of a passage through the seal, maintain a humidity level within an enclosure environment in which the package resides. For instance, humid gas may be passed between an interior region of the package and an enclosure environment in which the package resides, via the passage. In some implementations, the humidity level is maintained level by passing humid gas, which carries a portion of the liquid from within the package, from the package to the enclosure environment. Other implementations involve passing humid gas into the package from such an enclosure. In certain implementations, a membrane separates the desiccant material from the passage, and transfers moisture between the desiccant material and the passage.

In various embodiments, the apparatus includes a channel in the package, which has an opening extending from an environment within the package to an external surface of the package. The seal operates to seal the channel until the seal is altered (e.g., removed or punctured). The channel may, for example, be implemented to provide restricted transfer of moisture between the environment within the package and an environment in which the package resides, upon opening of the passage.

In some implementations, the seal includes a structural component having a channel that transfers moisture at a restricted rate, from or to an environment in the package including the desiccant. A sealing component initially seals the channel, and upon alteration (e.g., puncture or removal) provides an opening into the channel, therein coupling the environment in the package with an environment external to the package.

The package and desiccant can be implemented in a variety of manners. In some embodiments, the desiccant absorbs the liquid and, via the package and the seal, maintains relative humidity in an enclosure in which the package resides. Water vapor is absorbed as relative humidity in the enclosure exceeds a target range, and released as relative humidity in the enclosure falls below the target range.

In accordance with one or more embodiments, an apparatus having a package (and related environmental control module as applicable) further includes a sealed enclosure in which the package resides. The package and enclosure provide transfer of humid gas between an environment within the package and an environment within the enclosure (and external to the package). The desiccant material may, for example, absorb the liquid and provide a specified relative humidity within the sealed enclosure, by releasing the absorbed liquid via the passage.

In some embodiments, the apparatus includes a tool that operates to remove, break, or puncture the seal, or otherwise form an opening therein. The tool may, for example, be sealed within the enclosure and operate to provide an opening in the seal after the enclosure is sealed. This approach can provide for the exchange of a predetermined amount of humid gas from within the package to the environment within the enclosure.

An enclosure as referred to above can be used for a variety of approaches, such as to enclose a circuit or other component. In certain implementations, the enclosure is a hard disk drive enclosure having a hard disk-drive disk, a head-actuation assembly, and a motor. The head-actuation assembly and the motor operate to read and write data on the disk.

Packages or environmental control modules as characterized herein may be used to control moisture and/or other environmental parameters in enclosures of various mechanical and/or or electrical devices. For ease of explanation, the examples may be primarily described with reference to regulation of moisture in an enclosure housing a non-volatile memory such as a hard disk drive. However, such embodiments are applicable to implementation with a multitude of circuits, mechanical components and other items in various types of environments.

Figure 1:
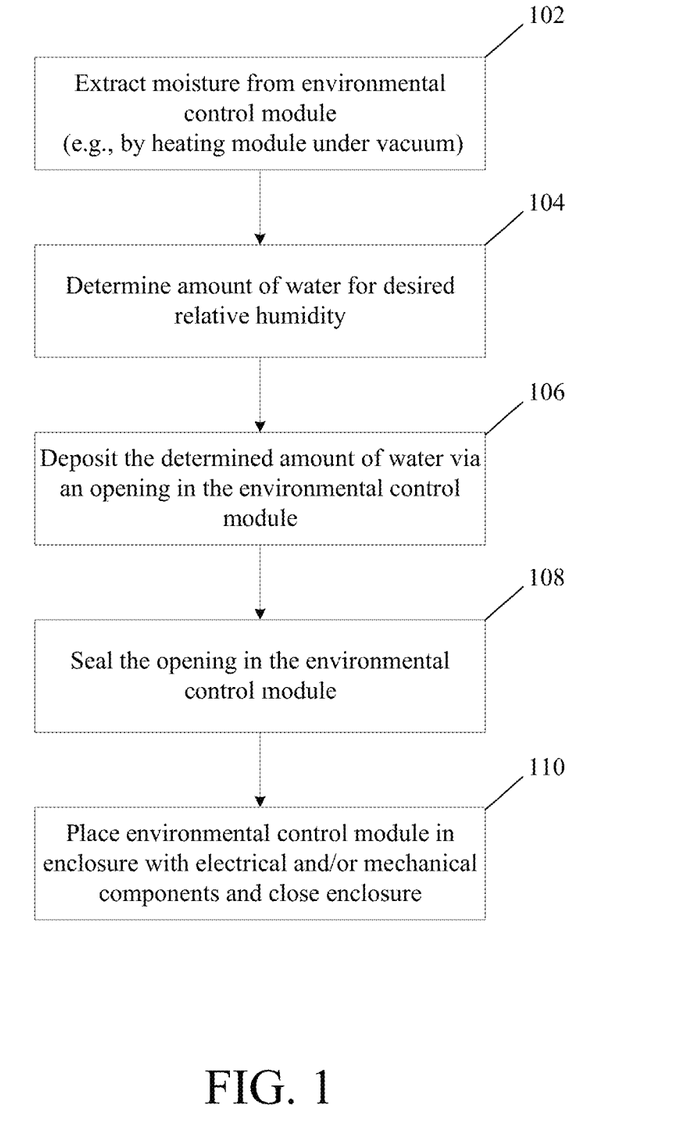
FIG. 1 shows a process for configuring an environment control module structure, consistent with various aspects of the present disclosure.

Turning now to the figures, FIG. 1 shows a process for configuring an environment control module structure, consistent with various aspects of the present disclosure. At block 102, moisture is extracted from an environmental control module. As previously indicated moisture may be extracted, for example, by increasing temperature (e.g., in an oven) and/or decreasing atmospheric pressure (e.g., in a vacuum chamber) to evaporate liquid and expand water vapor trapped in the environmental control module. Optionally, in some implementations, a seal may be placed over the opening in an environmental control module to maintain the desiccant material at the baseline moisture level for an extended period.

At block 104, an amount of liquid such as water to be added to the desiccant material to provide a desired relative humidity is determined. The amount of liquid may depend on the desired relative humidity level, the amount of desiccant material, and a volume of an enclosure to be regulated at the desired relative humidity level. The amount of liquid may be determined, for example, using a look-up table indicating respective amounts corresponding to a plurality of relative humidity levels for a specific amount of desiccant material and enclosure volume. At block 106, the determined amount of liquid is deposited in the environmental control module via the opening. At block 108, a seal is placed over the opening to contain the liquid within the environmental control module. As the liquid evaporates, it is absorbed by the desiccant material. In this manner, the desiccant material may be set to a desired moisture content with high accuracy. In some implementations, the liquid is heated prior to being deposited at block 106 to increase the rate of evaporation. The resulting environmental control module may then be immediately implemented with circuitry or other components in an enclosure or other environment, or otherwise provided as a separate module that may be implemented at a later time (e.g., shipped from a facility that manufactures the environmental control module to various entities that subsequently employ the modules with enclosures, such as by forming an opening in the module and placing the module in an enclosure).

In some embodiments, the method continues at block 110, at which the environmental control module is placed in the enclosure with electrical and/or mechanical components and the enclosure is closed. An opening is made in the environmental control module, which can be carried out prior to or after the environmental control module is sealed in the enclosure. This opening facilitates passage of moisture between the environmental control module and the enclosure (e.g., until an equilibrium-type state is achieved). Over time, moisture may be further passed in this context, such as after moisture in the enclosure escapes, which can be useful for ensuring that a set amount of moisture remains in the enclosure.

In some implementations, the seal placed over the opening includes a channel configured to transfer water vapor (or other gaseous material) in and out of the environmental control module. The channel allows water vapor released from the desiccant material to transfer to the enclosure and thereby provide and maintain a desired relative humidity in the enclosure. Conversely, the channel allows excess water vapor in the enclosure to be absorbed by the desiccant material.

In some implementations, the channel in the seal is initially absent or closed. This allows the set moisture of the desiccant material to be maintained for an extended period before the environmental control module is placed into service. The channel may be initially closed by a non-permeable layer (e.g., a layer of foil) in the seal or a temporary layer placed over the channel. If the channel is initially closed or absent, the channel may be opened or formed prior to closing the enclosure. An opening may be formed in the seal, for example, by penetrating a non-permeable layer in the seal.

In some implementations, the enclosure may also be filled with an inert gas prior to closing the enclosure. In some implementations, the filling of the enclosure with the inert gas may additionally serve to initially remove water vapor from the enclosure or set water vapor content to the environment to an initial value.

In some implementations, the channel may be formed or opened at a later time after the enclosure is closed. For example, in some implementations, the enclosure includes an electromechanical device configured to pierce a hole in the seal in response to electronic signal. In other implementations, the enclosure may include a hole for a user to manually insert a tool to pierce the seal of the environmental control module. The hole may also be used to inject an inert gas into the enclosure. After piercing the seal, an external seal may be placed over hole to close the enclosure and allow the environmental control module to regulate the relative humidity.

In some embodiments, multiple environmental control modules may be placed in an enclosure. The seals of the environmental control modules may be punctured, for example, at different times to extend the length of time at which the desired relative humidity may be maintained. In some implementations the enclosure may include a mechanical device configured to automatically puncture seals of environmental control modules at regular service intervals to maintain proper operation. In other implementations, seals of environmental control modules may be manually punctured by a user at regular service intervals to maintain proper operation of the device. For example, seals of environmental control modules may be punctured at regular service intervals indicated by terms of a warranty agreement for an apparatus.

Figure 2:
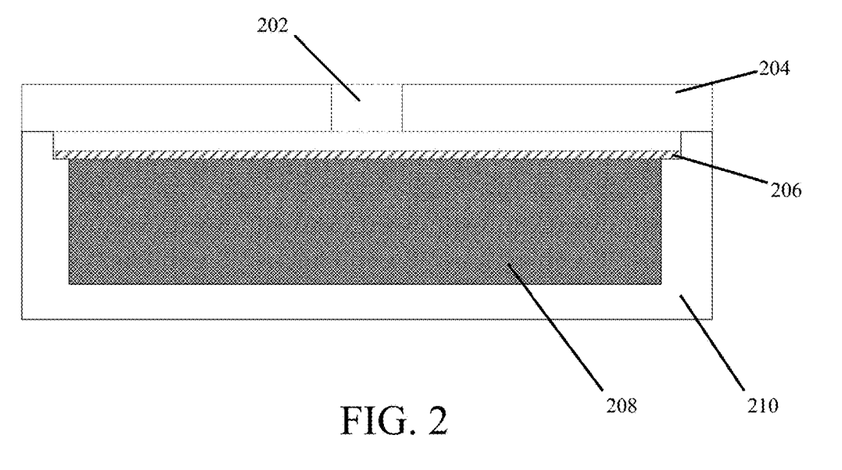
FIG. 2 shows a cross-sectional side view illustrating an environment control module structure, consistent with various aspects of the present disclosure.

FIG. 2 shows a cross-sectional side view illustrating an environment control module structure, consistent with various aspects of the present disclosure. The environmental control module includes a body 210 that is filled with a desiccant material 208. The body 210 may be a deformable material, such as a plastic-sealed bag, or a non-deformable material such as a metal housing. A membrane 206 covers the desiccant material 208. The desiccant material is configured to absorb and release water vapor to maintain a certain relative humidity in a substantially closed environment. Alternatively or additionally, the material 208 may include materials configured to regulate various other contaminants. For example, in some implementations, the material 208 may include a material configured to trap oxygen in an environment, to reduce the oxidation rate of copper wiring. The membrane 206 prevents the desiccant material 208 from escaping the body 210. The membrane 206 is configured to allow moisture to transfer to and from the desiccant material 208. A package lid 204 is configured to mate with the body 210 to form an enclosure for the desiccant material 208 and the membrane 206. The package lid 204 includes an opening 202 for moisture and/or regulated elements to enter and exit the environmental control module. As previously described, after removing moisture from the environmental control module, the desiccant material 208 may be charged by depositing an amount of liquid water or regulated contaminants via the opening 202 in the lid 204. As previously indicated, after depositing the liquid, via the opening, a seal is placed over the opening 202 to contain the added liquid within the environmental control module.

Figure 3:
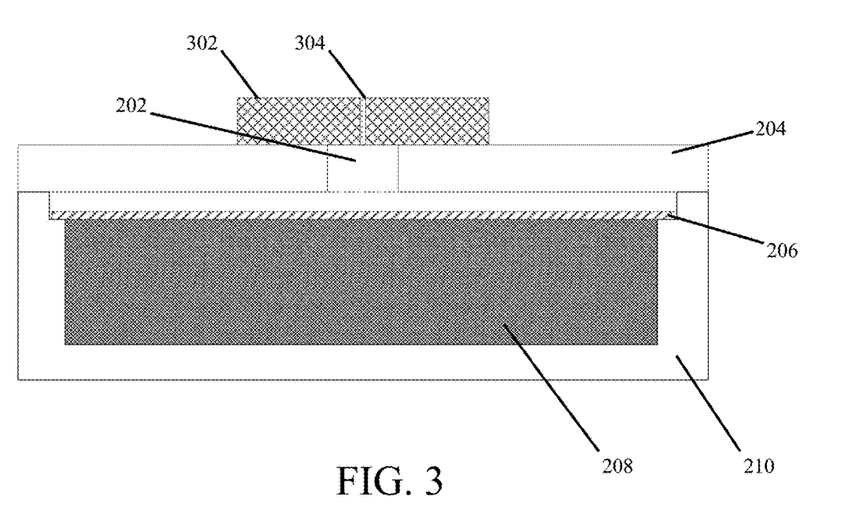
FIG. 3 shows a cross-sectional side view illustrating an environmental control module structure and seal, consistent with various aspects of the present disclosure.

FIG. 3 shows a cross-sectional side view illustrating the environmental control module of FIG. 2 with a seal 302 placed over the opening 202 in the lid 204. The seal 302 includes a channel 304 configured to transfer water vapor (or other gaseous material) in and out of the environmental control module. The size of the channel may be configured to control a rate at which water vapor is transferred in and out of the environmental control module. In some implementations, the channel 304 is initially absent from the seal 302 or closed, thereby allowing a set moisture charge of the desiccant material to be maintained for an extended period before the environmental control module is placed into service. As described in more detail with reference to FIG. 8, a channel may be formed in a seal by piercing one or more layers of the seal to create a hole.

Figure 4:
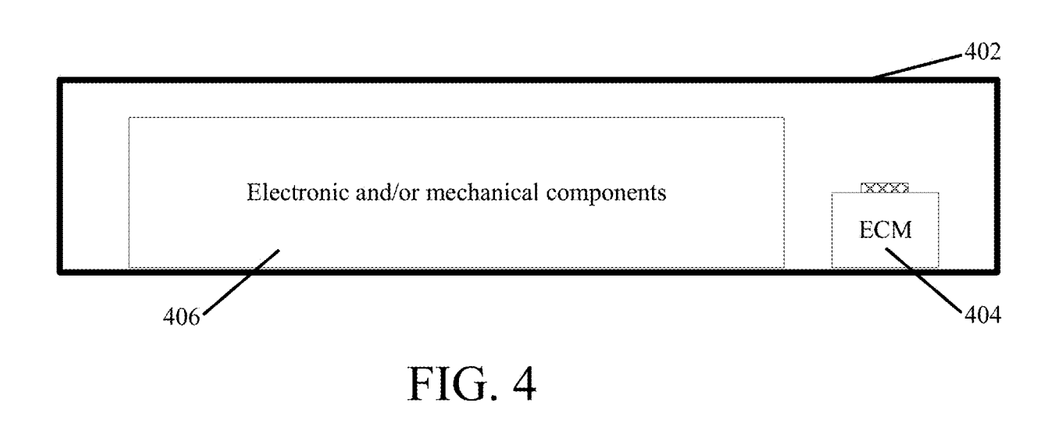
FIG. 4 shows a cross-sectional side view illustrating an example apparatus, consistent with various aspects of the present disclosure.

FIG. 4 shows a cross-sectional side view illustrating an example apparatus, consistent with various aspects of the present disclosure. In this example, the apparatus includes a sealed enclosure 402 containing one or more electronic and/or mechanical components 406 along with an environmental control module 404. As described with reference to FIGS. 1, 2, and 3, the environmental control module 404 includes a desiccant material that has been initialized to a moisture content level (e.g., using the process shown in FIG. 1) that is sufficient to maintain a desired relative humidity within the enclosure 402. The environmental control module 404 also includes a seal having a channel configured to transfer water vapor or other gaseous materials into and out of the environmental control module 404. When the relative humidity is too low in the enclosure 402, water vapor is released from the desiccant material in the environmental control module 404 and provided to the enclosure via the channel in the seal. Conversely, when the relative humidity is too high in the enclosure 402, water vapor is removed from the environment of the enclosure via the channel in the seal and absorbed by the desiccant material in the environmental control module 404.

In some embodiments, the apparatus shown in FIG. 4 includes a tool 409 operable to generate an opening in a seal 405. By way of example, the tool 409 is shown with a needle-like structure, but can be implemented with a variety of different structures that operate to provide an opening in the seal 405. In some implementations, a movable structure 408, such as a diaphragm-type structure, operates to move the tool 409 into contact with the seal 405. In certain implementations, the movable structure 408 is integrated with an external sidewall and operable for actuation by an external force, after the apparatus has been sealed. In other implementations, the tool 409 operates to provide an opening in the seal after the apparatus has been sealed, and without interaction by an external force.

Figure 5:
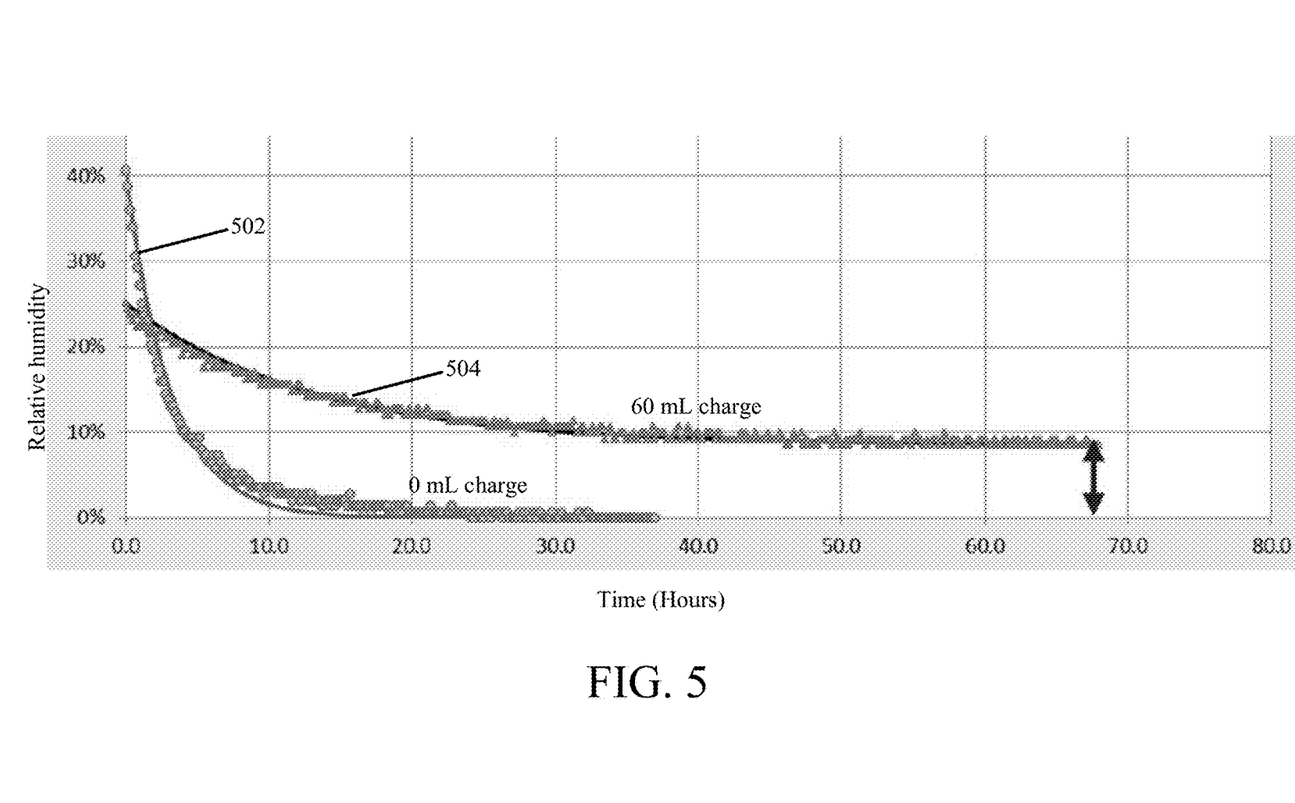
FIG. 5 shows a graph of relative humidity in an enclosure maintained by environmental control modules with various initial moisture charges, consistent with various aspects of the present disclosure.

As previously indicated, the moisture content of the desiccant material may be set to different levels to adjust the relative humidity level that is maintained by the environmental control unit. FIG. 5 shows a graph of relative humidity in an enclosure maintained by environmental control modules over time when charged with various initial moisture levels, consistent with various aspects of the present disclosure. In this example, the graph includes respective plots 502 and 504 for two initial moisture levels. A first plot 502 shows relative humidity maintained by an environmental control module having desiccant material with the baseline moisture level (e.g., 0%). At this moisture level, the desiccant material decreases relative humidity in an enclosed environment from approximately 40% to 0% in nearly 15 hours. The second plot 504 shows relative humidity maintained by an environmental control module having desiccant material initially charged with 60 μL of water. At this moisture level, the desiccant material decreases relative humidity in an enclosed environment from approximately 25% to 9% in approximately 40 hours. Thereafter, the relative humidity is maintained at this level. Thereafter, the desiccant material maintains the relative humidity at a nearly constant level. The relative humidity may be increased, relative to plot 504, by increasing the initial moisture level of the desiccant material (e.g., by depositing greater than 60 μL of water). Conversely, the relative humidity may be decreased, relative to plot 504, by decreasing the initial moisture level of the desiccant material (e.g., by depositing less than 60 μL of water).

Figure 6:
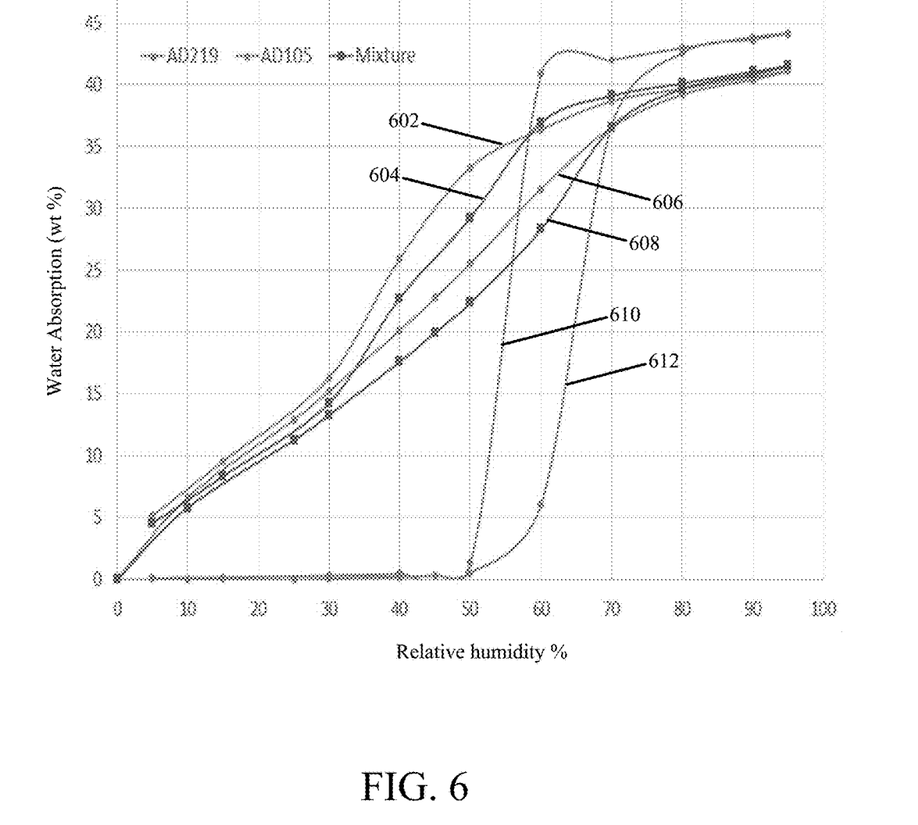
FIG. 6 shows a graph of water absorption by various materials at different relative humidity levels, consistent with various aspects of the present disclosure.

FIG. 6 shows a graph of water absorption by percentage of weight for various materials at different relative humidity levels. In this example, the graph includes 6 plots charting the water absorption for respective material samples. Plots 602 and 606 show water absorption by percentage of weight for respective samples of silica gel A. Plots 610 and 612 show water absorption by percentage of weight for respective samples of carbon-32. Plots 604 and 608 show water absorption by percentage of weight for respective samples of a mix of silica gel A and carbon-32.

Figure 7:
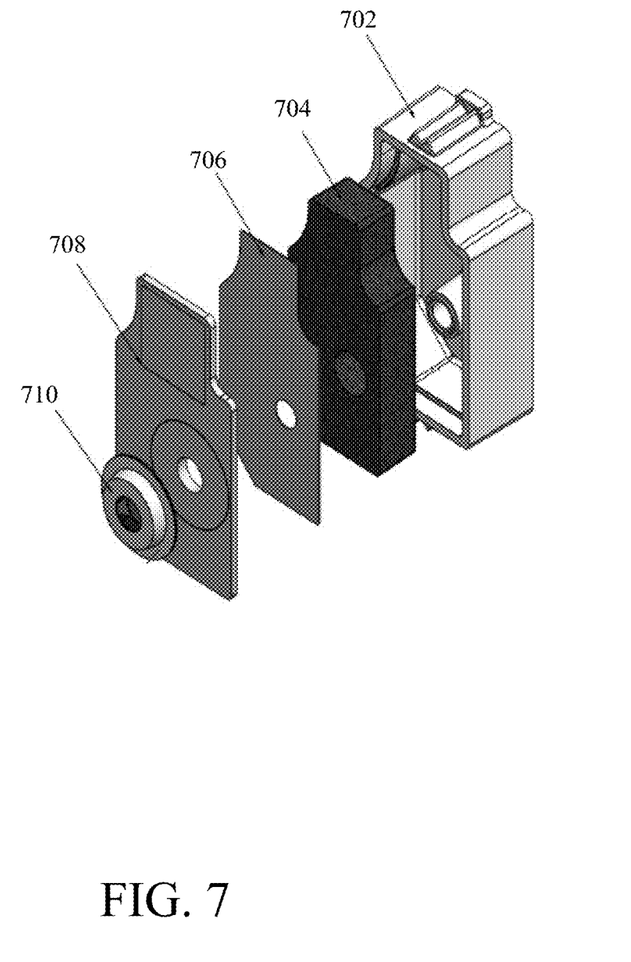
FIG. 7 shows a partial exploded perspective view of an example environmental control module, consistent with various aspects of the present disclosure.

FIG. 7 shows a partial exploded perspective view of an example environmental control module, consistent with various aspects of the present disclosure. The environmental control module includes a body 702 that is filled with a desiccant material 704. A membrane 706 covers the desiccant material 704. The membrane 706 contains the desiccant material 704 within the body 702 and is configured to allow moisture to transfer to and from the desiccant material 704. A package lid 708 is configured to mate with the body 702 to form an enclosure for the desiccant material 704 and the membrane 706. The package lid 708 includes an opening for moisture and/or regulated elements to enter and exit the environmental control module. As previously described, after removing moisture from the environmental control module, the desiccant material 704 may be charged by depositing an amount of liquid water or regulated element via the opening in the lid 708. After depositing the liquid, via the opening, a seal 710 is placed over the opening in the lid 708.

Figure 8:
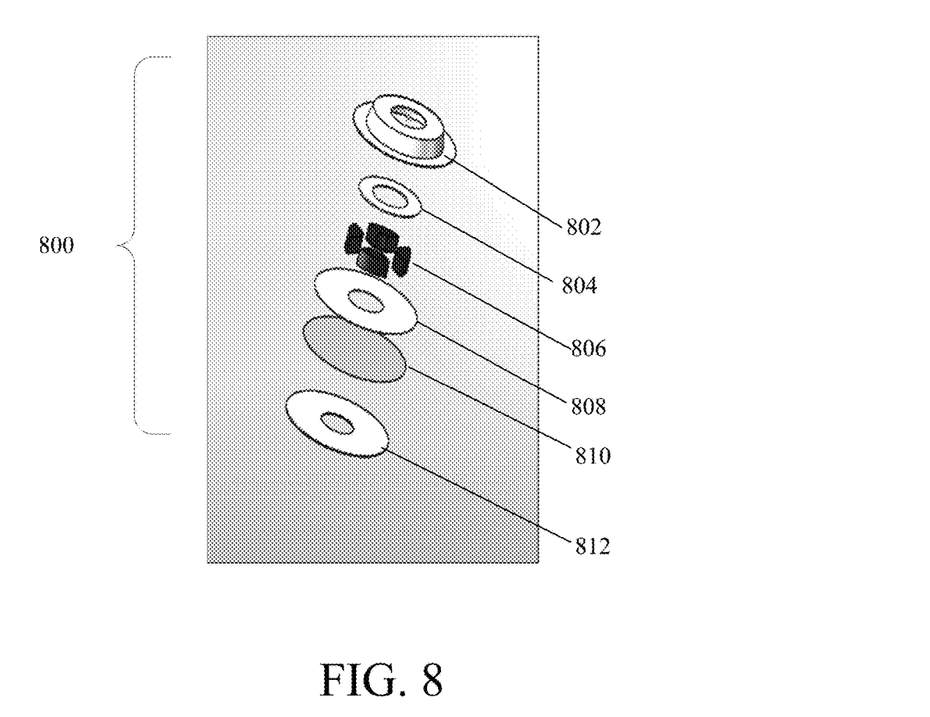
FIG. 8 shows a partial exploded perspective view of an example seal for use with an environmental control module, consistent with various aspects of the present disclosure.

Various types of seals may be used to cover the opening in the lid of the environmental control module. FIG. 8 shows a partial exploded perspective view of an example seal for use with an environmental control module, consistent with various aspects of the present disclosure. In this example, the seal 800 includes a membrane structure 802 (e.g., a polytetrafluoroethylene membrane) having a bottom lip configured to mate against a lid of environmental control module (e.g., lid 708 in FIG. 7). Foam wedges 806 are affixed inside the membrane structure 802 by a two-sided adhesive layer 804. In this example, a foil moisture barrier seal 810 is affixed to the bottom of the membrane structure 802 by a two-sided adhesive layer 808. Another two-sided adhesive layer 812 is affixed to the bottom of the foil moisture barrier seal 810. The two-sided adhesive layer 812 can be used to affix the seal 800 to a lid of an environmental control module to cover an opening in the lid.

A channel may be formed in the seal 800 by puncturing a small diameter hole in the foil moisture barrier seal 810. The channel is configured to transfer moisture (or other regulated material) in or out of an environmental control module. The foil moisture barrier seal 810 allows a desiccant material in the environmental control module to be maintained at an initial moisture charge until it is installed in an enclosure within which environmental conditions are to be regulated.

Figure 9A:
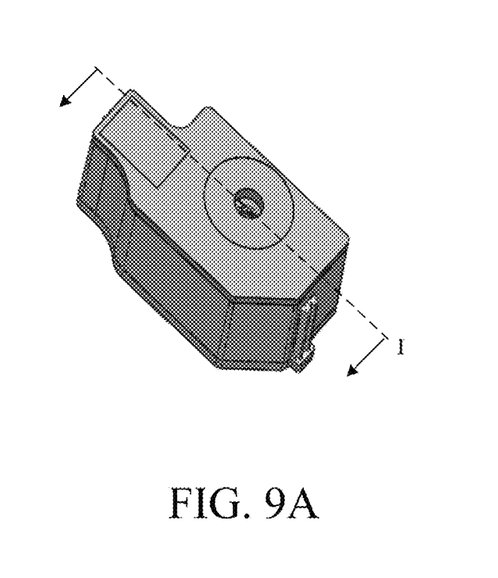
FIGS. 9A and 9B show a perspective and cross-sectional view of the environmental control module of FIG. 7 with an unsealed opening.
Figure 9B:
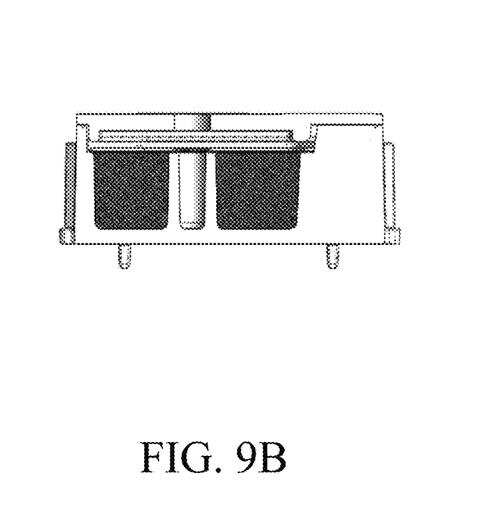
Figure 10A:
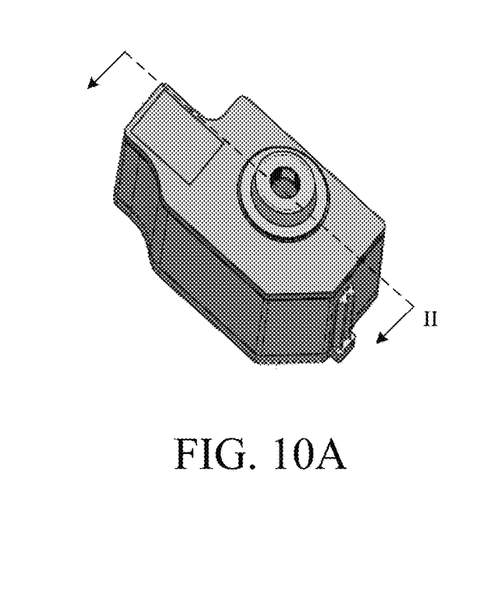
FIGS. 10A and 10B show a perspective and cross-sectional view of the seal of FIG. 8 applied to the environmental control module of FIG. 7.
Figure 10B:
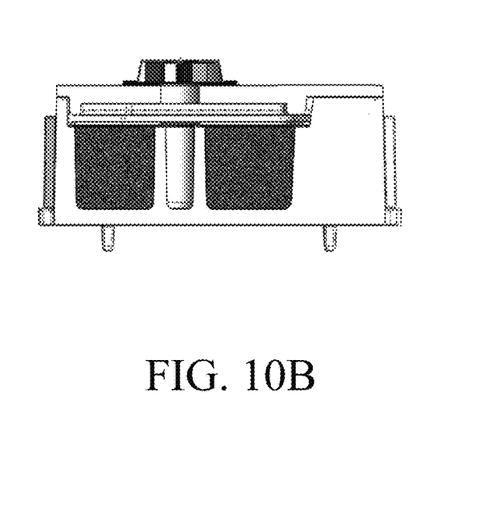

FIGS. 9A, 9B, 10A, and 10B show perspective and cross-sectional views of the environmental control module of FIG. 7 with sealed and unsealed openings. FIG. 9A shows a perspective view of the environmental control module of FIG. 7 with an unsealed opening. FIG. 9B shows cross-section I of the environmental control module of FIG. 9A. FIG. 10A shows a perspective view of the environmental control module of FIG. 7 with an opening covered using the seal shown in FIG. 8. FIG. 10B shows cross-section II of the environmental control module of FIG. 10A.

Figure 11:
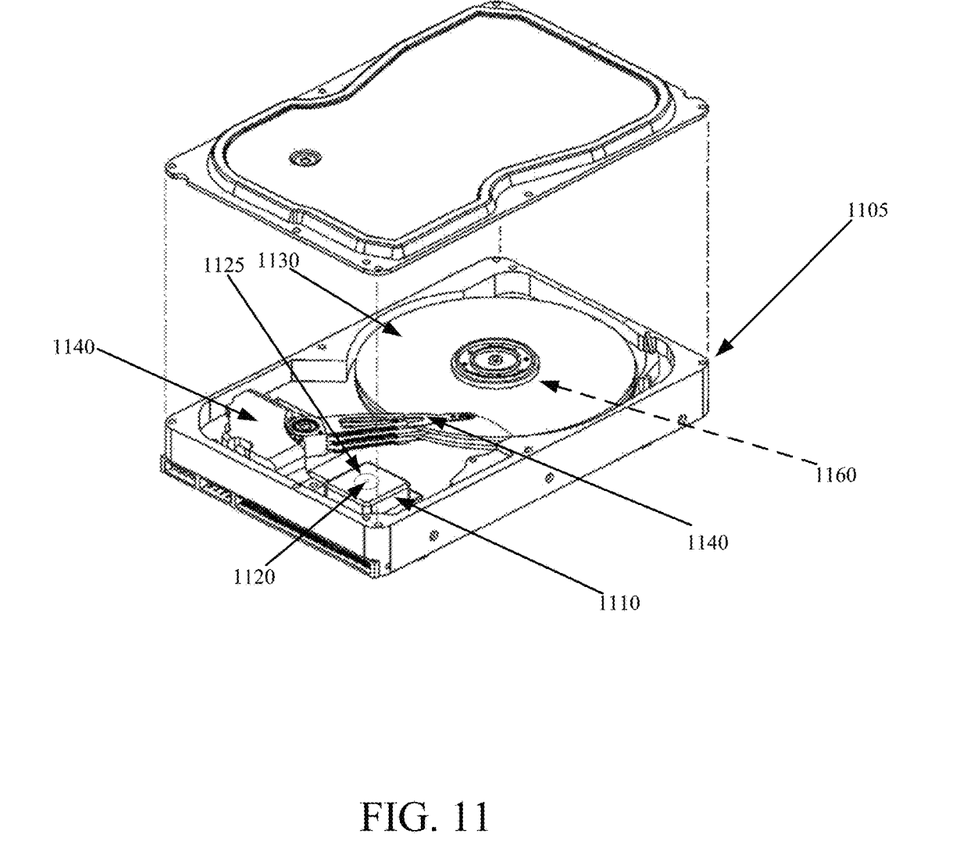
FIG. 11 shows a partial exploded perspective view illustrating a disk drive enclosure, consistent with various aspects of the present disclosure.

FIG. 11 shows a partial exploded perspective view illustrating a disk drive apparatus having an environmental control module, consistent with various aspects of the present disclosure. The disk drive apparatus includes an enclosure 1105 housing a media disk 1130 that stores data. The apparatus includes an actuator arm 1140 in the enclosure 1105. The actuator arm 1140 is configured to read data from and write data to the media disk 1130. The apparatus includes a motor 1160 within the enclosure 1105 that is configured to control the speed at which the media disk 1130 is rotated in the process of reading and writing data by the actuator arm 1140.

An environmental control unit 1110 is also mounted inside the enclosure 1105. The environmental control unit 1110 contains a desiccant material charged with an amount of liquid via an opening, as described above. The opening is covered by seal 1125. As previously indicated, in some implementations, the seal 1125 includes a pre-formed channel 1120 for transfer of gaseous material (e.g., water vapor) into or out of the environmental control module 1110 at a controlled rate. In some other implementations, the channel 1120 may not be present in the seal 1125 initially, or may initially be closed to prevent transfer of the gaseous material. The channel 1120 may be created or opened by puncturing a designated portion of the seal 1125. As an option and consistent with certain specific embodiments discussed above, a portion of the seal 1125 configured to form the channel 1120 when punctured can be aligned with an access port (not shown) of the enclosure 1105. A puncture tool may be used to pierce the seal through the aligned access port to create a channel in the seal for transfer of vapor at a controlled rate.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., determining an amount of liquid for a desired relative humidity, or controlling machinery for configuring moisture level of an environmental control module). For example, in certain of the above-discussed embodiments, one or more modules are discrete logic circuits or programmable logic circuits configured and arranged for implementing these operations/activities In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, though aspects and features may in some cases be described in individual figures, it will be appreciated that features from one figure can be combined with features of another figure even though the combination is not explicitly shown or explicitly described as a combination. Furthermore, various features of the different embodiments may be implemented in various combinations. Such modifications do not depart from the true spirit and scope of various aspects of the invention, including aspects set forth in the claims.

What is claimed is:

1. An apparatus comprising:
   a package;
   a desiccant material contained within the package;
   a liquid within the package; and
   a seal configured and arranged to seal the liquid and desiccant material in the package and being configured and arranged with the package, desiccant material and liquid to, upon opening of a passage through the seal, maintain a humidity level within an enclosure environment in which the package resides by passing humid gas between the package and the enclosure environment via the passage.

2. The apparatus of claim 1, wherein the seal is configured and arranged with the package, desiccant material and liquid to maintain the humidity level by passing humid gas, which carries a portion of the liquid from within the package, from the package to the enclosure environment.

3. The apparatus of claim 1, further including a channel in the package and having an opening extending from an environment within the package to an external surface of the package, the seal being configured and arranged to seal the channel.

4. The apparatus of claim 3, wherein the channel is configured and arranged to provide restricted transfer of moisture between the environment within the package and an environment in which the package resides, upon opening of the passage.

5. The apparatus of claim 1, further including a membrane that separates the desiccant material from the passage and that is configured and arranged to transfer moisture between the desiccant material and the passage.

6. The apparatus of claim 1, wherein the seal includes a structural component having:
   a channel configured to transfer moisture at a restricted rate, the channel being exposed to an environment in the package including the desiccant; and
   a sealing component that seals the channel, the sealing component being configured and arranged to, in response to a portion thereof being altered, provide an opening into the channel and therein couple the environment in the package with an environment external to the package, via the channel.

7. The apparatus of claim 1, wherein the desiccant is configured and arranged to absorb the liquid and to, via the package and the seal, maintain relative humidity in an enclosure in which the package resides by
   absorbing water vapor as relative humidity in the enclosure exceeds a target range, and
   releasing water vapor as relative humidity in the enclosure falls below the target range.

8. The apparatus of claim 1, wherein the seal is a material having an adhesive configured and arranged to adhere to an external surface of the package.

9. The apparatus of claim 1, further including a sealed enclosure, the package being within the sealed enclosure and configured and arranged with the enclosure to provide transfer of humid gas between an environment within the package and an environment that is external to the package and within the enclosure.

10. The apparatus of claim 9, wherein the desiccant material is configured and arranged to absorb the liquid and to provide a specified relative humidity within the sealed enclosure, by releasing the absorbed liquid via the passage.

11. The apparatus of claim 9, further including a tool configured and arranged to, with the package sealed within the enclosure, open the passage in the seal while the enclosure is sealed, therein providing exchange of a predetermined amount of humid gas from within the package to the environment within the enclosure.

12. The apparatus of claim 9, further including a circuit component sealed within the enclosure.

13. The apparatus of claim 12, wherein the circuit component includes a hard disk-drive disk, a head-actuation assembly, and a motor, the head-actuation assembly and the motor being configured and arranged to read and write data on the disk.

14. The apparatus of claim 9, wherein the desiccant material is configured and arranged to absorb the liquid and, upon opening of the passage, absorb vapor from a portion of the sealed enclosure that is external to the package.

* * * * *